United States Patent [19]

Gores et al.

[11] Patent Number: 5,511,118

[45] Date of Patent: Apr. 23, 1996

[54] METHOD OF PROVIDING D.C. FEED TO A TELEPHONE LINE

[75] Inventors: Stanley A. Gores, Kanata; Joseph F. M. Darveau, Aylmer; Francois Y. Tremblay, Hull; Stanley D. Rosenbaum, Ottawa; Reinhard W. Rosch, Richmond, all of Canada

[73] Assignee: Northern Telecom Limited, Montreal, Canada

[21] Appl. No.: 426,438

[22] Filed: Apr. 21, 1995

Related U.S. Application Data

[63] Continuation of Ser. No. 10,244, Jan. 28, 1993, abandoned, which is a continuation-in-part of Ser. No. 868,893, Apr. 16, 1992, which is a continuation-in-part of Ser. No. 862,478, Apr. 2, 1992, Pat. No. 5,323,461, which is a continuation-in-part of Ser. No. 648,776, Jan. 31, 1991, Pat. No. 5,103,387.

[51] Int. Cl.⁶ .................................................. H04M 1/00
[52] U.S. Cl. ............................................ 379/399; 379/413
[58] Field of Search ...................................... 379/398, 399, 379/400, 401, 402, 403, 404, 340, 412, 413, 324

[56] References Cited

U.S. PATENT DOCUMENTS

| | | | |
|---|---|---|---|
| 4,130,735 | 12/1978 | Chambers et al. | 379/401 |
| 4,254,305 | 3/1981 | Treiber . | |
| 4,315,106 | 2/1982 | Chea, Jr. . | |
| 4,317,963 | 3/1982 | Chea, Jr. . | |
| 4,343,971 | 8/1982 | Beene | 379/324 |
| 4,431,868 | 2/1984 | Bolus et al. . | |
| 4,631,359 | 12/1986 | Johansson et al. | 379/324 |
| 4,837,818 | 6/1989 | Pieters et al. | 379/382 |
| 5,103,387 | 4/1992 | Rosenbaum et al. | 363/21 |
| 5,175,764 | 12/1992 | Patel et al. | 379/413 |

FOREIGN PATENT DOCUMENTS

| | | |
|---|---|---|
| 0034384 | 8/1981 | European Pat. Off. . |
| 00071301 | 2/1983 | European Pat. Off. . |
| 59-83452 | 5/1984 | Japan . |
| 61-005670 | 1/1986 | Japan . |

*Primary Examiner*—Jeffery Hofsass
*Assistant Examiner*—Jack Chiang
*Attorney, Agent, or Firm*—R. John Haley

[57] ABSTRACT

A two-wire telephone line is supplied with d.c. feed from a drive circuit including two amplifiers via which a transmission signal is supplied to the line. Output potentials of the two amplifiers determine a loop current on the line, which is monitored and used to control a supply voltage for the drive circuit, the amplifier output potentials being offset from the supply potentials by headroom voltages to accommodate the transmission signal. The resulting current limiting voltage control acts iteratively to converge the supply voltage and a target voltage which is inversely dependent on an amount by which the loop current exceeds a predetermined value, the rate of convergence being fast for high loop currents for rapid response and slow for small differences to provide stable operation. The headroom voltages can be increased to nearly the supply voltage to reverse the polarity of the d.c. feed while maintaining current limiting.

16 Claims, 3 Drawing Sheets

METHOD OF PROVIDING D.C. FEED TO A TELEPHONE LINE

This is a continuation of U.S. patent application Ser. No. 08/010,244 filed Jan. 28, 1993, now abandoned in the names of Stanley A. Gores et al. and entitled "Method Of Providing D.C. Feed To A Telephone Line", which is a continuation-in-part of copending U.S. patent application Ser. No. 07/868,893 filed Apr. 16, 1992 in the names of R. W. Rosch et al. and entitled "Telephone Line Interface Circuit With Voltage Control" which is a continuation-in-part of U.S. patent application Ser. No. 07/862,478 filed Apr. 2, 1992 U.S. Pat. No. 5,323,461 in the names of S. D. Rosenbaum et al. and entitled "Telephone Line Interface Circuit With Voltage Switching", which is itself a continuation-in-part of U.S. patent application Ser. No. 07/648,776 filed Jan. 31, 1991 in the names of S. D. Rosenbaum et al. and entitled "High Voltage Converter", resulting in U.S. Pat. No. 5,103,387 issued Apr. 7, 1992. The entire disclosure of each of the parent applications is hereby incorporated herein by reference.

CROSS-REFERENCE TO RELATED APPLICATIONS

Reference is also directed to U.S. patent application Ser. No. 07/868,941 filed Apr. 16, 1992 in the names of R. W. Rosch et al. and entitled "Wideband Telephone Line Interface Circuit", the entire disclosure of which is hereby incorporated herein by reference.

BACKGROUND OF THE INVENTION

This invention relates to a method of providing d.c. feed from a line interface circuit to a two-wire telephone line. As is well known, d.c. feed is one of a variety of functions which must be performed by a line interface circuit provided at a telephone central office (CO) or remote terminal, and includes the supply of a direct current, generally referred to as loop current, to a telephone line for purposes such as determining the hook state and dial pulsing of a telephone connected to the line and supplying a bias current or power to the telephone.

It is common to provide this current from the CO battery supply via balanced feed resistors. Because the line impedance may vary significantly for lines of different lengths, and because the battery voltage is relatively constant, the loop current also can vary widely and, in particular, can be much higher for short lines than is required for proper operation of the telephone equipment. This results in the disadvantages of undesirably high power consumption and dissipation, especially in the feed resistors.

Although constant current d.c. feed arrangements have been proposed in order to avoid these disadvantages, these give rise to other disadvantages. Accordingly, a need has remained for a voltage driven d.c. feed arrangement in which the above disadvantages are reduced.

This need is addressed in Treiber U.S. Pat. No. 4,254,305 issued Mar. 3, 1981 and entitled "Current Limited Subscriber Line Feed Circuit", in which loop current on a telephone line is sensed and used to control a voltage generator, whose output is coupled to the line via the feed resistors, in order to reduce the supply voltage when the loop current exceeds a threshold level of 40 mA. In this circuit, voice signals are coupled to and from the line via a conventional transformer and electronic hybrid circuit.

With evolution of telephone line interface circuits, it has been recognized that it is desirable to reduce size, cost, and power consumption, and to increase versatility, as much as possible. This involves eliminating bulky conventional transformers, using common line drive circuitry for d.c. feed and a.c. signal handling, and programming components such as digital signal processors and control circuitry to enable a single line interface circuit to be adaptable to many different telephone line characteristics and telephone service capabilities. With such evolution, the line feed circuit arrangement of the Treiber patent discussed above is not practical.

In Chea, Jr. U.S. Pat. No. 4,315,106 issued Feb. 9, 1982 and entitled "Apparatus For Regulating Current Supplied To A Telephone Line Signal Of The Type Employed In Digital Telephone Systems" there is described an arrangement in which loop current is regulated by a differential amplifier and summing arrangement whose output is used to control a voltage amplifier, which may be constituted by a d.c. to d.c. converter, to produce a supply voltage for the line. This patent does not address the coupling of signals to and from the line.

In the related Chea, Jr. U.S. Pat. No. 4,317,963 issued Mar. 2, 1982 and entitled "Subscriber Line Interface Circuit Utilizing Impedance Synthesizer And Shared Voltage Source For Loop Current Regulation Control" the supply voltage is described as being switched among a plurality of voltage sources for loop current regulation, and signals are coupled to the line via amplifiers which with their surrounding components are described as comprising "a pair of buffer amplifiers capable of handling the dc and ac electrical requirements of the SLIC function". There is no further description as to the extent of these requirements or how they would be met.

There are many such requirements of the line interface circuit function which are well known in the art, and which are both stringent and difficult to meet in a versatile and adaptable manner. One of these requirements is to permit reversal of the polarity of the supply voltage to the telephone line. Generally, this requirement has been met by providing a polarity reversing relay via which the line interface circuitry is coupled to the line, but the reversing relay is a mechanical component of the line interface circuit, constituting part of its bulk and cost and being subject to mechanical failure. It is accordingly desirable to avoid the need for this reversing relay while still meeting the line interface circuit requirements. However, the latter Chea, Jr. patent would require that a reversing relay be present to permit polarity reversal.

In Bolus et al. U.S. Pat. No. 4,431,868 issued Feb. 14, 1984 and entitled "Solid State Telephone Line Interface Circuit With Ringing Capability" there is described a line interface circuit in which both d.c. and a.c. signals are supplied to the inputs of high-voltage tip and ring wire amplifiers whose outputs are coupled to the fine. The d.c. levels at the amplifier outputs are determined by d.c. potentials at the amplifier inputs and the d.c. gain of the amplifiers. The description states that it is possible for the tip and ting d.c. polarities to be reversed by reversing the polarities at the inputs to the amplifiers, but does not discuss this further.

This patent is concerned with using the amplifiers also to produce a (high voltage) ringing signal waveform on the line, as well as to couple voice signals to the line. To these ends, and to ensure operation of the amplifiers within linear parts of their characteristics, the supply voltage rails of the amplifiers are controlled to follow, with an offset, the instantaneous values of the ringing signal waveform or d.c.

feed characteristics which are not described in detail. The supply voltage rails are coupled to outputs of a d.c. to d.c. converter which is controlled by a sensing circuit and error amplifier in dependence upon the supply voltages and the amplifier output voltages.

In the Bolus et al. patent the two amplifiers must be operated in a high-gain configuration, thus requiring that the gain-bandwidth product of the amplifiers be much larger than the bandwidth required to support telephony signals. In addition, the amplifiers must accommodate the high ringing voltages, and therefore must be fabricated using a very high voltage silicon process. This combination of requirements makes the approach of the Bolus et al. patent impractical. To carry a variety of voice and data traffic, including ISDN signals, requires an even larger bandwidth, and also adds a requirement for a fast slew rate. The approach of the Bolus et al. patent is also impractical for meeting these additional requirements.

An object of this invention is to provide an improved method of providing d.c. feed to a two-wire telephone fine.

SUMMARY OF THE INVENTION

According to one aspect of this invention there is provided a method of providing d.c. feed to a two-wire telephone line, comprising the steps of: generating a supply voltage for a drive circuit including two amplifiers each having an output coupled to a respective wire of the line, the drive circuit serving to supply a transmission (e.g. voice) signal to the line via the amplifiers; determining potentials at the amplifier outputs in dependence upon the supply voltage and headroom voltages required for operation of the amplifiers to supply the transmission signal to the line, a difference between the potentials at the outputs of the two amplifiers producing a loop current on the line; monitoring the loop current on the line; and controlling the generated supply voltage in dependence upon the monitored loop current.

As the generated supply voltage determines the amplifier output potentials producing the loop current on the line, and is controlled in dependence upon the monitored loop current, this arrangement serves to limit the loop current in a desirable and controlled manner, while maintaining desired headrooms for the amplifiers so that they can accommodate signals for supply to the line without distortion or clipping.

Preferably the step of controlling the generated supply voltage comprises the steps of: producing a target value corresponding to a target voltage inversely dependent upon an amount by which the monitored loop current exceeds a predetermined value; and adjusting the generated supply voltage towards the target voltage in dependence upon the target value; and iteratively repeating these steps whereby the target voltage and the generated supply voltage converge.

A convenient predetermined value of the monitored loop current is about 20 mA, this being the minimum current required for proper operation of some telephones which may be connected to the line. Thus the more the monitored loop current exceeds this predetermined value, the smaller can be the magnitude of the target voltage, to produce an initially bigger difference between the generated supply voltage and the target voltage.

It is advantageous if the step of adjusting the generated supply voltage is iteratively repeated at a faster rate for large differences than for small differences between the generated supply voltage and the target voltage. The different rates enable particularly high loop currents, which may be due to a very short telephone line or due to a fault such as a short-circuit of the line, to be reduced rapidly, while providing for stable operation in conjunction with different types of telephone connected to the telephone line.

For example, the step of adjusting the generated supply voltage can be iteratively repeated at a rate of at least about once per millisecond for large differences, and at a rate of at most about once per 10 milliseconds for small differences, between the target voltage and the generated supply voltage. In an embodiment of the invention described below, adjustments are effected every 0.5 ms and every 100 ms for respectively large and small differences between the supply voltage and the target voltage. These rates and times are given by way of example of typical parameters which may be selected in particular circumstances, and other values may be chosen.

In order to provide a well-controlled convergence of the generated supply voltage and the target voltage, which maintains stable operation for various types of telephone connected to lines with various characteristics, each adjustment of the generated supply voltage towards the target voltage can be by an amount which is a predetermined fraction, for example one sixteenth, of a difference between the generated supply voltage and the target voltage.

Preferably, as in an embodiment of the invention described in detail below, the two amplifiers are d.c. amplifiers and the step of determining potentials at the amplifier outputs comprises: coupling the generated supply voltage between two supply lines of the drive circuit whereby the supply lines have relative potentials of zero volts and the generated supply voltage; for a first one of the amplifiers whose output is coupled to a tip wire of the line, determining a potential at an input of the amplifier by passing a controlled current through a resistance, to produce at the output of the amplifier a tip potential which is offset from zero volts, towards the generated supply voltage, by a tip headroom voltage; and for a second one of the amplifiers whose output is coupled to a ring wire of the line, determining a potential at an input of the amplifier by passing a controlled current through a resistance, to produce at the output of the amplifier a ting potential which is offset from the generated supply voltage, towards zero volts, by a ring headroom voltage.

This method conveniently further comprises the step of selectively reversing polarity of d.c. feed to the line by increasing the controlled currents so that each of the tip and ting headroom voltages exceeds half the generated supply voltage. Typically in this case the tip and ring headroom voltages are set to approach, but not reach, the generated supply voltage to provide a maximum reversed polarity d.c. feed to the line while still operating the amplifiers within a linear pan of their characteristics, to ensure linear amplification without signal distortion or clipping.

To accommodate the reversed polarity d.c. feed, preferably the step of controlling the generated supply voltage comprises the steps of: producing a target value corresponding to a target voltage inversely dependent upon an amount by which the monitored loop current exceeds a predetermined value; adjusting the generated supply voltage towards the target voltage in dependence upon the target value; and if the polarity of d.c. feed to the line is reversed, determining the controlled currents, thereby to determine the tip and ting headroom voltages, in dependence upon the generated supply voltage; and iteratively repeating these steps whereby the target voltage and the generated supply voltage converge. Thus in this case the tip and ring headroom voltages are adjusted in conjunction with the generated supply voltage in the reversed polarity state, to maintain the desired linear operation of the amplifiers while limiting the loop current on the line.

Thus the invention enables the loop current on the line provided by the two drive amplifiers, via which the transmission signal is coupled to the line, to be limited in a manner which maintains sufficient headroom between the drive amplifier outputs and the supply rails to ensure adequate linearity for the transmission function. The drive amplifiers are conveniently unity-gain buffers for maximum bandwidth and stability.

BRIEF DESCRIPTION OF THE DRAWINGS

The invention will be further understood from the following description with reference to the accompanying drawings, in which.

DETAILED DESCRIPTION

Figure 1:
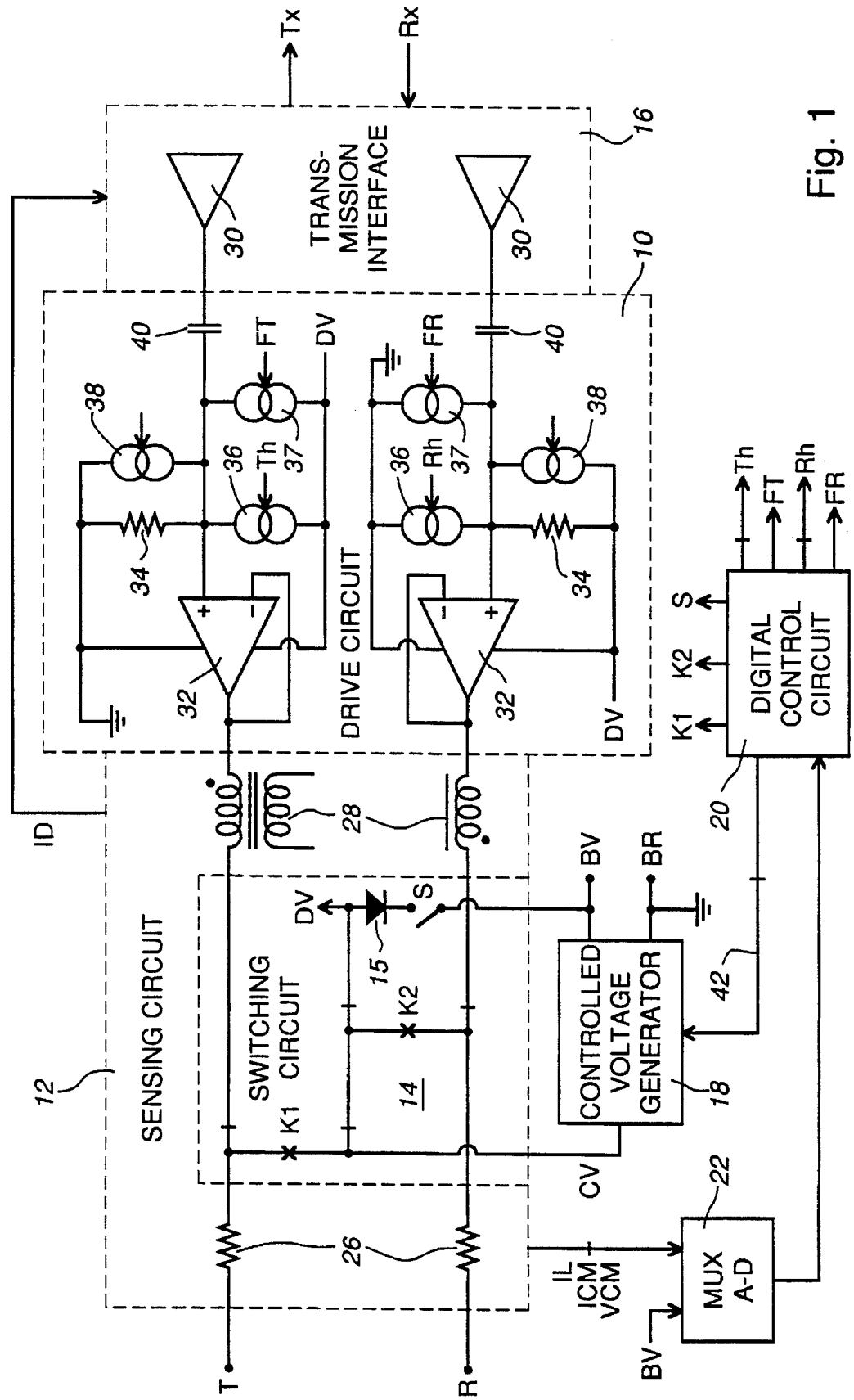
FIG. 1 is a block diagram illustrating a telephone line interface circuit which operates in accordance with the method of this invention.

Referring to FIG. 1, there is illustrated a block diagram showing parts of a telephone line interface circuit, which is assumed in the following description to form part of and be located at a telephone central office (not shown), or CO, but which may alternatively form part of a remote terminal which is coupled to a CO via a multiplexed communications path. Only those pans of the line interface circuit which are relevant to a full understanding of this invention are shown in FIG. 1.

As shown within broken outlines, the line interface circuit comprises a drive circuit 10 which is coupled to terminals T and R, for connection to the tip and ring wires of a two-wire telephone line, via a sensing circuit 12 and a switching circuit 14. The drive circuit 10 is also coupled to a transmission interface 16 which communicates with the remainder of the CO via transmit and receive signal paths Tx and Rx respectively. The line interface circuit also includes a controlled voltage generator 18, a digital control circuit 20, and a multiplexing analog-to-digital (A-D) converter 22.

The drive circuit 10, sensing circuit 12, and transmission interface 16 are conveniently of the form fully described in United States patent application Ser. Nos. 07/862,478 and 07/868,941 already referred to. The drive circuit 10 is also described below. Only those parts of the sensing circuit 12 and the transmission interface 16 which are essential to a full understanding of this invention are illustrated in FIG. 1 and are described below.

The sensing circuit 12 includes a balanced arrangement of feed resistors 26 connected in series with windings of a small a.c. sensing transformer 28 between the outputs of the drive circuit 10 and the terminals T and R, and produces output signals ID, IL, ICM, and VCM. The signal ID represents the differential a.c. or signal current on the telephone line and hence flowing via the terminals T and R, and is supplied to the transmission interface 16. The signal IL represents the loop current on the telephone line, i.e. direct current flowing in opposite directions via the two terminals T and R, and the signal ICM represents the common mode current on the telephone line, i.e. current flowing in the same direction via the two terminals T and R. Individual currents on the tip and ting wires of the telephone line are respectively the sum and difference of the common mode current and the loop current. The signal VCM represents a common mode voltage on the telephone line when the feed resistors 26 are disconnected from the terminals T and R by the opening of contacts, not shown, of a protection relay.

The transmission interface 16 produces a signal on the transmit path Tx from the differential current signal ID, and includes amplifiers 30 having low impedance outputs, constituting outputs of the transmission interface 16 coupled to the drive circuit 10, at which are produced complementary signals derived from a signal received via the receive path Rx.

The drive circuit 10 comprises two circuits, associated with the tip and ring terminals T and R respectively, each of which comprises a d.c. buffer amplifier 32, a resistor 34, a controlled current source 36, two switched current sources 37 and 38, and a coupling capacitor 40. Each amplifier 32 has its output, constituting a respective output of the drive circuit 10, connected to its inverting input to provide the amplifier with a unity gain so that these amplifiers have a maximum bandwidth and a minimum output impedance. Each amplifier 32 has its non-inverting input connected via the capacitor 40 to a respective output of the transmission interface 16, via the resistor 34 in parallel with the switched current source 38 to a first voltage supply rail (ground or zero volts for the tip side because in normal d.c. feed the tip wire is held at a voltage close to ground, and at a drive circuit supply voltage DV for the ring side because in normal d.c. feed the ring wire is held at a voltage close to this voltage DV, as described further below), and via the controlled current source 36 in parallel with the switched current source 37 to a second voltage supply raft (DV for the tip side, and ground for the ring side). The amplifiers 32 are supplied with power from the ground and DV voltage supply rafts.

Currents passed by the controlled current sources 36 are precisely controlled by eight-bit digital signals supplied by the digital control circuit 20; these signals and their decimal values are referred to as Th and Rh (for Tip headroom and Ring headroom respectively). Currents passed by the current sources 37 are switched on or off by binary signals FT and FR supplied by the digital control circuit 20. The switched current sources 38 are turned on, by control circuitry (not shown) within the drive circuit 10, when the currents passed by the current sources 36 are at a very low value and the current sources 37 are switched off, as is further described below. As an alterative which is not further described here, the switched current sources 38 could be controlled directly by binary signals supplied by the digital control circuit 20.

The switching circuit 14 comprises two latching relays, referenced K1 and K2, and an electronic switch S which are controlled by correspondingly referenced control signals supplied by the digital control circuit 20. The relays are shown in a reset state having one open contact (represented by an X) and two closed contacts (each represented by a vertical bar), one of which is in the path from the output of a respective amplifier 32 to the respective terminal T or R, and the other of which is in a series path from an output of the controlled voltage generator 18 to the drive circuit supply voltage line DV. In this state the switch S, which is in series between a −48 volt battery voltage line BV and the drive circuit supply voltage line DV, is open, and the controlled voltage generator 18 is controlled by the digital control circuit 20 via a path 42 to generate a controlled voltage CV which constitutes the drive circuit supply voltage DV. A grounded battery return line BR is also connected to the controlled voltage generator 18. The switching circuit 14 also includes a diode 15 connected in series with the switch S, which diode serves to prevent contention between the voltages CV and BV during opening (ram-off) of the electronic switch S.

In another operating state, which is used to conserve power in the on-hook or idle state, the digital control circuit 20 renders the controlled voltage generator 18 inactive, so that its output presents a high impedance, and closes the switch S so that the battery voltage BV constitutes the drive circuit supply voltage DV. Other operating states of the switching circuit 14 and the controlled voltage generator 18, not relevant to the d.c. feed of this invention, and further details of these parts of the line interface circuit, are fully described in United States patent application Ser. No. 07/862,478 and U.S. Pat. No. 5,103,387 already referred to.

The signals IL, ICM, and VCM produced by the sensing circuit 12 are supplied to inputs of the multiplexing A–D converter 22, whose digital outputs are supplied to the digital control circuit 20. The battery voltage BV is also supplied to an input of the converter 22 so that this voltage can be monitored by the digital control circuit 20. The digital control circuit 20 monitors the digitized signals IL, ICM, VCM, and BV and operates in accordance with a stored program, for example down-loaded from the CO, to produce the various control signals discussed above and thereby to determine appropriate operating conditions for the remainder of the line interface circuit. Such operating conditions include that of d.c. feed in both normal and reversed polarity states as further described below.

By way of example and not limitation, in the following description it is assumed that the battery voltage BV is derived from a telephone CO battery and is typically a little more negative than −49 volts, but may fall below (i.e. be more positive than this) when the battery is relatively discharged, and that the battery return terminal BR is at 0 volts. The controlled voltage generator 18, when enabled and supplied with a control signal Cv via the path 42 from the digital control circuit 20, generates the controlled voltage in accordance with the equation:

$$CV = -56 + Cv*0.182 \text{ volts} \quad (1)$$

where Cv is an integer from 0 to 255. Thus a zero value of Cv corresponds to a maximum controlled voltage CV of −56 volts, and a maximum value of 255 of Cv corresponds to a minimum controlled voltage CV of about −9.6 volts.

It is also assumed that each resistor 34 has a resistance of 475 kΩ, and that each capacitor 40 has a capacitance of 0.1 μF, so that these components together provide (when the switched current sources 37 and 38 are off) a time constant of the order of 50 ms for d.c. voltage changes at the non-inverting inputs of the amplifiers 32. Each controlled current source 36 passes a current from 0 to 128 μA as determined by the respective control signal Th or Rh, each of which is an integer having a value from 0 to 255. Thus the respective tip or ring voltage dropped across the resistor 34, referred to as a headroom voltage H, is given by the equation:

$$H = 0.475*128*h/255 \text{ volts} \quad (2)$$

where h is the decimal value of the respective control signal Th or Rh.

In order to maintain bias conditions in the drive circuit, the headroom signals h are allowed by the software in the digital control circuit 20 to have a minimum digital value of 3. This corresponds to a current through the controlled current source 36 of about 1.5 μA, and in accordance with the above equation to a headroom voltage of less than one volt which would not be practical. Accordingly, such a very low current situation is, as mentioned above, detected within the drive circuit 10 and used to turn on the switched current source 38, which passes a relatively high current for example in a range from about 0.1 to 10 mA, e.g. 0.5 mA. This enables the magnitudes of the respective headroom voltage H to be rapidly decreased, within a time which is much less than the time constant defined by the resistor 34 and capacitor 40. The drive circuit 10 also includes circuitry, not shown, for bypassing the resistors 34 and providing a rapid charge or discharge of the capacitors 40 in the event that the drive circuit supply voltage DV is reduced quickly and the output voltages of the amplifiers 32 come too close to the supply voltages DV and ground.

The switched current sources 37 similarly serve to permit the magnitudes of the headroom voltages TH and RH to be rapidly increased within a time much less than the time constant defined by the resistor 34 and the capacitor 40. For this purpose, the current sources 37 are turned on by the binary control signals FT and FR from the digital control circuit 20, and each source 37 is assumed to pass a current of about 450 μA when it is turned on. The switched current sources 37 and 38 pass substantially no current when they are turned off.

For the control functions described below, the digital control circuit 20 uses a digital representation of the loop current IL produced via the multiplexing A–D converter 22. As the loop current IL can flow in either direction around a telephone subscriber loop connected to the terminals T and R (depending on the applied polarity as described further below), the digital control circuit 20 uses a digital representation of the absolute value of the loop current. In the following description, the designation Ilp is used to refer to an integer which constitutes this digital representation and can have a decimal value from 1 to 128. For convenience, the value of Ilp corresponds directly to the loop current IL measured in milliamps. For example, a sensed loop current IL of ±3.5 mA is represented by an Ilp value of 4, and a sensed loop current IL of ±127.5 mA or more is represented by an Ilp value of 128.

It is observed that, in order to accommodate manufacturing tolerances and variations in the hardware of the line interface circuit, the digital control circuit 20 can also store various calibration values for parameters such as the loop current, which calibration values can be used by the digital control circuit to ensure precise operation as described herein of the particular line interface circuit. For example, the value Ilp representing the loop current IL is produced accurately in the digital control circuit 20 by modifying the actually sensed loop current in accordance with a stored loop current calibration value.

The common mode current and voltage signals ICM and VCM also supplied to the digital control circuit 20 are used for other control functions than those described here, and accordingly are not further discussed. When the battery voltage BV is at least −49 volts and a connected telephone line is in an on-hook state, the digital control circuit 20 renders the controlled voltage generator 18 inactive to conserve power and closes the switch S so that the battery voltage is used to power the fine. In this state the digital control circuit 20 monitors the battery voltage BV via the A-D converter 22 every 0.5 ms. In the event that the battery voltage BV becomes more positive than 31 49 volts, this is detected by the digital control circuit 20, which then activates the controlled voltage generator 18 to generate a voltage of −56 volts to power the line even in this on-hook state.

The digital control circuit 20 uses the absolute loop current value Ilp to distinguish between the on-hook and off-hook states of the line, Ilp<10 representing the on-hook state and Ilp>13 representing the off-hook state. Ilp values from 10 to 13 constitute a dead zone, in which the previous hook state is presumed to have been maintained, to avoid oscillations between the different states due to loop impedances.

The following description relates to the operation of the line interface circuit in the off-hook state of the line, and relates to three particular operating conditions which are referred to as current limiting, polarity reversal, and return to normal polarity conditions. These conditions are explained with reference to voltage-time diagrams in FIGS. 2 and 3 and flow charts in FIGS. 4, 5, and 6.

As is well known, the resistance of a telephone fine which may be connected to the terminals T and R is dependent upon the length of the fine, and in the off-hook state may also vary in dependence upon the number of off-hook telephones connected to the fine, the total resistance varying for example from about 0 to more than 1900 Ω. In conventional arrangements in which the CO battery is used as a d.c. source for the loop current on the line, the current can be high for short telephone lines, leading to excessive power consumption and dissipation. The current limiting condition of the line interface circuit of FIG. 1 operates to sense the loop current IL and to control the voltage applied to the terminals T and R so that this current is limited in a desirable manner. At the same time, this condition is arranged to ensure that adequate tip and ring headroom voltages exist to permit the transmission of voice signals between the telephone line and the transmission interface 16 without distortion or clipping by the drive circuit 10.

It is also well known that it is desirable, for example for signalling purposes, to be able to reverse the polarity of the d.c. feed to the telephone line; conventionally this is effected by a reversing relay via which the fine is connected to the terminals T and R. With the line interface circuit of FIG. 1 such a reversing relay can be dispensed with, and polarity reversal, and return to normal polarity, can be effected by steering the voltages at the non-inverting inputs of the amplifiers 32 and hence at the terminals T and R. These correspond to the polarity reversal and return to normal polarity conditions referred to above and further described below. In the reversed polarity condition, it is still desirable for the current limiting condition to be applied and it is still necessary for adequate tip and ring headroom voltages to be maintained.

Figure 2:
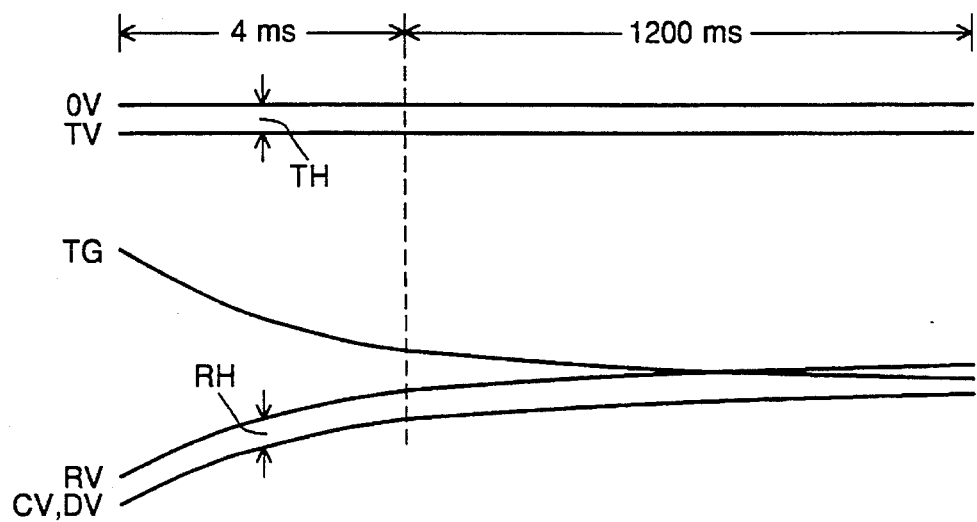
FIGS. 2 and 3 are voltage-time diagrams.

Referring to FIG. 2, the current limiting operating condition is represented by several voltages shown as a function of time. It should be noted that time is represented linearly over a short period of about 4 ms to the left of a vertical dashed line in FIG. 2, and linearly over a much longer period of 1200 ms to the right of this fine. The voltages shown in FIG. 2 are a zero voltage (0 V), the voltage DV supplied to the drive circuit 10 and constituted by the controlled voltage CV of the controlled voltage generator 18, a tip wire voltage TV which is offset from (more negative than) 0 V by a constant normal tip headroom voltage TH, a ring wire voltage RV which is offset from (more positive than) the drive circuit voltage DV by a constant normal ring headroom voltage RH, and a target voltage TG.

The outputs of the tip and ring amplifiers 32 are controlled to be at the voltages TV and RV respectively, so that the difference TV-RV constitutes a d.c. feed voltage for the line connected to the terminals T and R, the resulting loop current IL which flows being dependent upon this voltage difference and the line resistance. The tip and ring headroom voltages TH and RH respectively, i.e. the voltages by which the outputs of the amplifiers 32 are offset towards one another from the supply voltages of the drive circuit 10, accommodate the maximum amplitude a.c. voltages of transmission signals (e.g. voice or information signals) on the line and a minimum differential between the amplifier output and supply voltages to accommodate tolerances and avoid distortion. By way of example, these headroom voltages are selected by the headroom control signals Th and Rh both having the value 17, so that from equation (2) the headroom voltages TH and RH are both about 4 volts.

Initially on detection of an off-hook condition, as shown at the left of FIG. 2, via the path 42 the digital control circuit 20 turns on the controlled voltage generator 18 (unless it is already on due to a discharged CO battery) and controls it by supplying the decimal value Cv=0 to generate the maximum voltage of −56 volts.

The digital control circuit 20 operates cyclically, performing a variety of software functions in respective time slots every 0.5 ms. The current limiting operation is one of these software functions (other functions include, for example, calibrating the sensed loop current and monitoring the battery voltage as discussed above, and updating a timer which is used for timing waiting periods discussed below), and accordingly a software routine for carrying out the current limiting operation is returned to every 0.5 ms. This routine is represented by the flow chart in FIG. 4 and is further described below.

Figures 4, 5, 6:
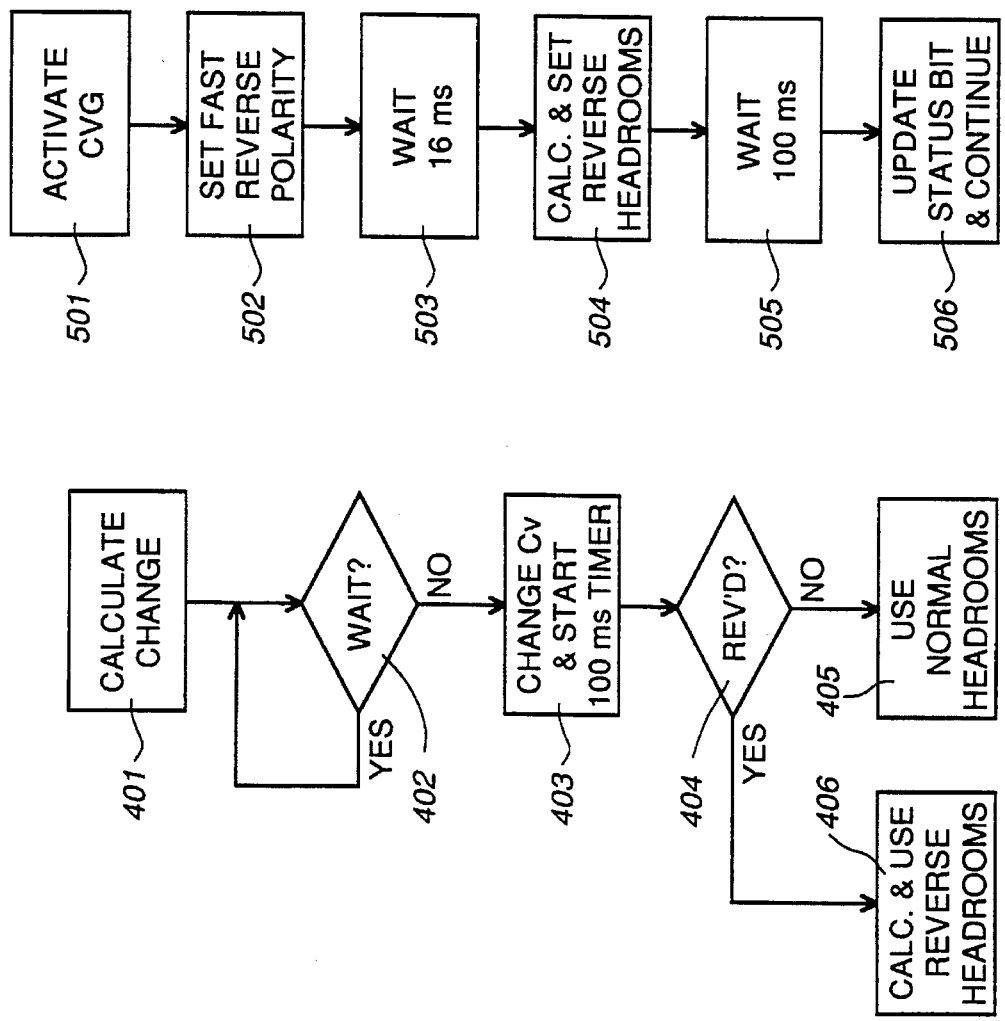
FIGS. 4, 5, and 6 are flow charts, with reference to which operations of the line interface circuit of FIG. 1 in accordance with the method of this invention are explained.

In a first step 401 in FIG. 4, the digital control circuit 20 calculates a desired change for the drive circuit voltage DV, based on the sensed loop current. This calculation includes determining a target decimal value Tv from the loop current value Ilp using the equation:

$$Tv = 8*(Ilp-21) \qquad (3)$$

with Tv having a minimum value of 0 for Ilp<21 and having a maximum value of 255 for Ilp>53, and determining an adjustment decimal value Av using the equation:

$$Av = (Tv-Cv)/16 \qquad (4)$$

The target value Tv has the same relationship to the target voltage TG as the value Cv has to the controlled voltage CV as defined by equation (1). Thus TG=−56+Tv* 0.182 volts.

It should be noted that the constants in equation (3) are given by way of example and can be varied to suit particular circumstances. The constant 21 defines a threshold loop current of 21 mA above which the current limiting operation is effective, and is chosen to be equal to the minimum required current of 20 mA plus a maximum sensing error of 1 mA. The factor 8 determines the steepness of the current limiting and is chosen to optimize the power dissipation while still maintaining a proper loop current to ensure correct operation of the telephone, especially with telephones whose characteristics (e.g. sidetone and transmit levels) are dependent upon the loop current. Both the threshold and the steepness of the current limiting operation may thus be varied as desired.

Similarly, the constant 16 in equation (4) is given only by way of example. This division factor is selected to achieve a desired rate of convergence between the voltages TG and CV in a stable manner and without overshoot. The result of the division is truncated by the digital control circuit, with positive results becoming the next lower positive integer and negative results becoming the next higher negative integer, to create a dead zone which prevents hunting (e.g. when the detected loop current changes due to signal currents) and which is offset in favor of providing a higher current. This division factor can be varied to control the size of the dead zone and the rate of convergence.

In a step 402 in FIG. 4, a decision is made as to whether a change is to be made immediately (i.e. within the 0.5 ms period) or after a waiting period determined by a timer; this decision is discussed further below. In a subsequent step 403, a change in the decimal value Cv is made by adding the determined adjustment value Av to it; in other words the value Cv is replaced by Cv+Av. The value Av can be positive to reduce the voltage DV, or it can be negative to increase the voltage DV for example in the event that the loop resistance increases due to an extension telephone being placed on-hook. Also in step 403, a 100 ms timer is started.

In a step 404 in FIG. 4, a status bit discussed further below is checked to determine whether reversed polarity is being applied to the line. If not, then as indicated by a step 405 the normal polarity headrooms discussed above (Th=Rh=17, so that TH=RH=4 volts) are used. In the case of reversed polarity being applied to the line, as indicated by a step 406 different headroom voltages are calculated and used; this is discussed further below with reference to FIGS. 3 and 5.

As illustrated in FIG. 2, the current limiting control is such that over time the target voltage TG and the drive circuit voltage DV converge to approximately (to avoid control loop oscillations) the same value. The decision made in the step 402 selects one of two possible rates at which this convergence takes-place. For relatively large differences between the target voltage TG and the drive circuit voltage DV, and hence for relatively large values of the adjustment value Av (e.g. for Av>5 in the case of normal polarity, and for Av>8 in the case of reversed polarity), it is determined at step 402 that there should be no waiting period, and successive changes to the controlled voltage CV at step 403 can be made every 0.5 ms. This is represented in FIG. 2 to the left of the vertical dashed line, where there is a rapid convergence of the voltages TG and DV over a short period. For smaller differences and adjustment values the decision at step 402 is to wait until expiry of the 100 ms timer started at step 403 in a previous cycle; consequently such smaller changes to the controlled voltage CV are made only every 100 ms, as shown in FIG. 2 to the fight of the vertical dashed line.

These different rates of change of the controlled voltage CV, and hence the drive circuit voltage DV, provide the advantages of stability of the control loop and no audible noise for small changes with various different types of telephone connected via the line to the terminals T and R, and rapid reduction of the drive circuit voltage in the event that the loop current is suddenly increased, for example due to a telephone going off-hook. As already indicated above, all of the particular parameters used in these respects can be varied to suit particular circumstances, and it is also observed in this respect that different timer periods can be used for the normal and reversed polarities applied to the line. By way of example, however, it is observed that the rapid rate of change of the controlled voltage CV may be at least about ten times the slower rate; for example the faster rate may involve a change every millisecond or less, and the slower rate may involve a change every 10 ms or more.

It is observed at this point that the target voltage TG represented in FIG. 2 is not, and need not be, physically produced in the operation of the line interface circuit, but is referred to for providing a full understanding of the control of the controlled voltage CV to achieve current limiting in accordance with the invention. The target voltage TG corresponds directly to the value Tv, which as indicated especially by equations (3) and (4) above is involved in the determination of the adjustment of the controlled voltage CV in dependence upon the loop current value Ilp.

Figure 3:
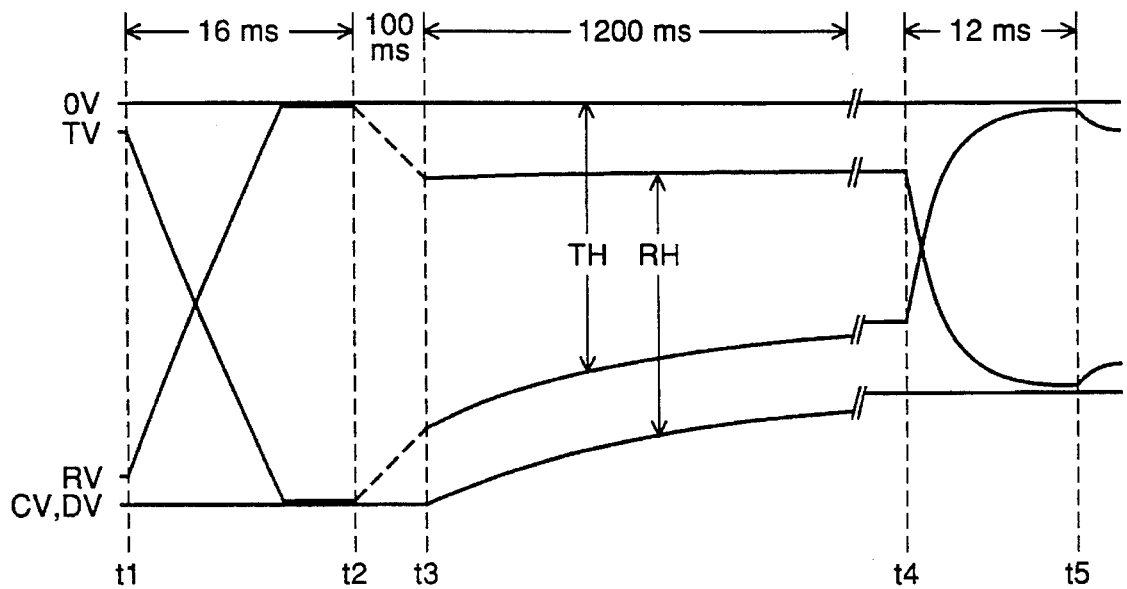

FIG. 3 illustrates, in a voltage-time diagram similar to that of FIG. 2 but not showing any target voltage TG, the tip, ring, and drive circuit voltages TV, RV, and DV respectively for the polarity reversal and return to normal polarity conditions. Polarity reversal is effected between times t1 and t3 in FIG. 3 in accordance with the flow chart in FIG. 5. Return to normal polarity is effected between times t4 and t5 in FIG. 3 in accordance with the flow chart in FIG. 6. Between the times t3 and t4 in FIG. 3 the current limiting condition described above applies with reversed polarity.

In a first step 501 in FIG. 5, at the time t1 in FIG. 3, a reversal of the polarity of the tip and ring voltages TV and RV applied to the line via the terminals T and R is started by rendering the controlled voltage generator 18 active to generate its full voltage of −56 volts (Cv=0 on the path 42), unless the controlled voltage generator is already active in which case no change is made in step 501, the generator remaining active as controlled by the prevailing value of Cv. In a step 502, a "fast reverse polarity" state is set, and as illustrated by a wait step 503 this state is maintained for a period of 16 ms, until a time t2 in FIG. 3. A shorter period than 16 ms, for example 12 ms or only 8 ms, may alternatively be used.

In the fast reverse polarity state the digital control circuit 20 turns on the switched current sources 37 via the binary signals FT and FR, and also sets the tip and ring headroom control signals Th and Rh to their maximum value of 255. As a result, as shown in FIG. 3 the tip and ting voltages TV and RV, defined by the voltages at the non-inverting inputs of the amplifiers 32, are moved rapidly to the opposite supply voltage rails (i.e. the tip voltage TV is moved to the voltage DV, and the ring voltage RV is moved to 0 V), where they are clamped, and the current sources are turned off, until the time t2 by the physical constraints of the drive circuit.

At the time t2 the digital control circuit 20 turns off the switched current sources 37 via the signals FT and FR and, as shown by a block 504 in FIG. 5, calculates and sets new tip and ring headrooms for the reversed polarity state. These are maintained for a loop settling waiting period of 100 ms between the times t2 and t3 as shown by a block 505 in FIG. 5, this period being sufficient to allow ringing or other variation of the tip and ring voltages TV and RV (shown by dashed lines in FIG. 3 during this period) to subside and for these voltages to settle at their values determined by the calculated reverse polarity headrooms. As shown by a block 506 in FIG. 5, at the time t3 the digital control circuit 20 sets a polarity status bit to indicate the reversed polarity of the fine, this bit being checked at the decision block 404 as already described above, and continues with the current limiting operating condition represented in FIG. 4. This operating condition, represented between the times t3 and t4 in FIG. 3, is as already described above except that, due to the reversed polarity decision at the block 404, for each change of the controlled voltage CV the headrooms are recalculated as shown by the block 406.

The calculation of appropriate headrooms for the reversed polarity state as represented in blocks 406 and 504 is described below. As shown in FIG. 3, in the reversed polarity state the headroom voltages TH and RH are relatively large, being measured from 0 V to the tip voltage TV and from the drive circuit voltage DV to the ring voltage RV respectively, and furthermore these headroom voltages must be varied with variation of the drive circuit voltage DV. Due to the large magnitude of the headrooms in the reversed polarity state, in order to maintain linear operation of the amplifiers 32 the headroom voltages must be determined in a manner to take into particular account tolerances and manufacturing variations of the line interface circuit. To facilitate this, the digital control circuit 20 stores a parameter Rb for the particular line interface circuit. The parameter Rb represents the control signal values Th and Rh which are necessary to provide the line interface circuit with desired headrooms on entry into the reversed polarity state with the full controlled voltage CV. In other words, between the times t2 and t3 in FIG. 3, when Cv=0, Th=Rh=Rb. The value Rb is typically in a range of about 190 to 200 or more.

In an embodiment of the invention, the headroom control signal values Th and Rh are calculated to be equal to Rb–Cv * ¾ for values of Rb less than 200 and to be equal to Rb–Cv * 13/16 for values of Rb of 200 or more, these calculations being performed relatively easily in the software in the digital control circuit 20 and providing appropriate headrooms for the various reverse polarity operating conditions of the line interface circuit. Again, these equations are given by way of example only of one way in which it is ensured that adequate headrooms are maintained for transmission of signals at any controlled voltage produced by the generator 18.

In the return to normal polarity operating condition represented between the times t4 and t5 in FIG. 3 and by the flow chart in FIG. 6, initially as shown by a block 601 in FIG. 6 a "fast normal polarity" state is set, and as shown by a block 602 this is maintained for a period of 12 ms until the time t5. In this fast normal polarity state the digital control circuit 20 sets the headroom control signals Th and Rh each to its minimum value of 3. In consequence, the controlled current sources 36 pass currents below the threshold level at which the drive circuit 10 turns on the switched current sources 38, these accordingly passing relatively large currents to rapidly charge or discharge the capacitors 40. In consequence, as shown in FIG. 3, at the time t5 the tip and ring voltages TV and RV are close to the drive circuit supply voltages of 0 V and DV respectively.

At the time t5, as shown by a block 603 in FIG. 6 the headroom voltages TH and RH are set for the normal polarity situation as described above with reference to FIG. 2. As shown by a block 604 in FIG. 6, the digital control circuit 20 then sets the polarity status bit to indicate the normal polarity of the line and continues with the current limiting operating condition represented in FIG. 4.

Although a particular embodiment of the invention has been described in detail, it should be appreciated that numerous modifications, variations, and adaptations may be made without departing from the scope of the invention as defined in the claims.

What is claimed is:

1. A method of providing d.c. feed to a two-wire telephone line, comprising the steps of:

generating a supply voltage for a drive circuit including two amplifiers each having an output coupled to a respective wire of the line;

supplying an a.c. transmission signal to the line via the amplifiers of the drive circuit;

determining potentials at the amplifier outputs in dependence upon the supply voltage and headroom voltages required for operation of the amplifiers to supply the transmission signal to the line, a difference between the potentials at the outputs of the two amplifiers producing a loop current on the line;

monitoring the loop current on the line; and digitally controlling the generated supply voltage in dependence upon the monitored loop current by the steps of, iteratively at each of a plurality of successive time instants:

determining a target value corresponding to a target voltage inversely dependent upon an amount by which the monitored loop current exceeds a predetermined value; and adjusting the generated supply voltage towards the target voltage in dependence upon the target value;

whereby the target voltage and the generated supply voltage converge over said plurality of successive time instants.

2. A method as claimed in claim 1 wherein a time interval between successive ones of said time instants is less for large differences than for small differences between the target voltage and the generated supply voltage.

3. A method as claimed in claim 2 wherein said time interval between successive ones of said time instants is less than about one millisecond for large differences, and is more than about 10 milliseconds for small differences, between the target voltage and the generated supply voltage.

4. A method as claimed in claim 2 wherein said predetermined value of the monitored loop current is about 20 mA.

5. A method as claimed in claim 1 wherein said predetermined value of the monitored loop current is about 20 mA.

6. A method as claimed in claim 5 wherein each adjustment of the generated supply voltage towards the target voltage is by an amount which is a predetermined fraction of a difference between the generated supply voltage and the target voltage.

7. A method as claimed in claim 1 wherein each adjustment of the generated supply voltage towards the target voltage is by an amount which is a predetermined fraction of a difference between the generated supply voltage and the target voltage.

8. A method as claimed in claim 1 wherein each adjustment of the generated supply voltage towards the target voltage is by an amount which is about one sixteenth of a difference between the generated supply voltage and the target voltage.

9. A method as claimed in claim 1 wherein the two amplifiers are d.c. amplifiers and the step of determining potentials at the amplifier outputs comprises:

coupling the generated supply voltage between two supply lines of the drive circuit whereby the supply lines have relative potentials of zero volts and the generated supply voltage;

for a first one of the amplifiers whose output is coupled to a tip wire of the line, determining a potential at an input of the amplifier by passing a controlled current through a resistance, to produce at the output of the amplifier a tip potential which is offset from zero volts, towards the generated supply voltage, by a tip headroom voltage; and for a second one of the amplifiers whose output is coupled to a ring wire of the line, determining a potential at an input of the amplifier by passing a controlled current through a resistance, to produce at the output of the amplifier a ring potential which is offset from the generated supply voltage, towards zero volts, by a ring headroom voltage.

10. A method as claimed in claim 9, further comprising the step of selectively reversing polarity of d.c. feed to the line by increasing the controlled currents so that each of the tip and ring headroom voltages exceeds half the generated supply voltage.

11. A method as claimed in claim 10 and comprising the step of
determining the controlled currents, thereby to determine the tip and ring headroom voltages, in dependence upon the generated supply voltage when the polarity of d.c. feed to the line is reversed.

12. A method as claimed in claim 11 wherein a time interval between successive ones of said time instants is less for large differences than for small differences between the target voltage and the generated supply voltage.

13. A method as claimed in claim 12 wherein said predetermined value of the monitored loop current is about 20 mA.

14. A method as claimed in claim 11 wherein said predetermined value of the monitored loop current is about 20 mA.

15. A method as claimed in claim 14 wherein each adjustment of the generated supply voltage towards the target voltage is by an amount which is a predetermined fraction of a difference between the generated supply voltage and the target voltage.

16. A method as claimed in claim 11 wherein each adjustment of the generated supply voltage towards the target voltage is by an amount which is a predetermined fraction of a difference between the generated supply voltage and the target voltage.

* * * * *